(12) United States Patent
Bhartia et al.

(10) Patent No.: US 10,728,849 B2
(45) Date of Patent: Jul. 28, 2020

(54) TRAFFIC INDICATOR MAP FOR NETWORKS WITH MULTIPLE ACCESS POINTS

(71) Applicant: Cisco Technology, Inc., San Jose, CA (US)

(72) Inventors: Apurv Bhartia, San Mateo, CA (US); Lizhen Lin, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/177,942

(22) Filed: Nov. 1, 2018

(65) Prior Publication Data

US 2020/0145841 A1 May 7, 2020

(51) Int. Cl.
*H04W 24/02* (2009.01)
*H04W 24/08* (2009.01)
*H04W 52/02* (2009.01)
*H04W 88/08* (2009.01)
*H04W 24/10* (2009.01)

(52) U.S. Cl.
CPC ....... *H04W 52/0219* (2013.01); *H04W 24/02* (2013.01); *H04W 24/08* (2013.01); *H04W 24/10* (2013.01); *H04W 88/08* (2013.01)

(58) Field of Classification Search
CPC . H04W 68/00; H04W 52/0216; H04W 68/02; H04W 52/0219; H04W 56/001; H04W 24/08; H04L 67/1078
See application file for complete search history.

(56) References Cited

U.S. PATENT DOCUMENTS

| | | | |
|---|---|---|---|
| 2005/0232200 A1* | 10/2005 | Jeong | H04W 52/0216 370/331 |
| 2013/0142095 A1 | 6/2013 | Calcev et al. | |
| 2016/0150557 A1* | 5/2016 | Lee | H04W 74/04 370/338 |
| 2018/0054250 A1 | 2/2018 | Zhang et al. | |
| 2019/0296820 A1* | 9/2019 | Moshfeghi | H04B 17/336 |

OTHER PUBLICATIONS

International Search Report and Written Opinion from the International Searching Authority, dated Jan. 17, 2020, 9 pages, for corresponding International Patent Application No. PCT/US2019/057399.

* cited by examiner

*Primary Examiner* — Omer S Mian
(74) *Attorney, Agent, or Firm* — Polsinelli PC (57) ABSTRACT

A method is performed by a first access point (AP) of a plurality of access points (APs). The first AP includes a non-transitory memory and one or more processors coupled with the non-transitory memory. In some implementations, the method includes determining traffic information for a first set of client devices that are being served by the first AP. In some implementations, the method includes obtaining traffic information for a second set of client devices that are being served by a second AP of the plurality of APs. In some implementations, the method includes synthesizing a unified traffic indicator map (TIM) based on the traffic information for the first set of client devices and the traffic information for the second set of client devices. In some implementations, the method includes transmitting the unified TIM to the plurality of APs. In some implementations, the unified TIM satisfies a network performance criterion.

20 Claims, 6 Drawing Sheets

TRAFFIC INDICATOR MAP FOR NETWORKS WITH MULTIPLE ACCESS POINTS

TECHNICAL FIELD

The present disclosure relates generally to networks, and in particular, to a traffic indicator map for networks with multiple access points.

BACKGROUND

Access Points (APs) allow client devices to connect to a network. When a client device associates with a particular AP, the client device begins receiving traffic that is destined for the client device via that particular AP. Receiving and transmitting data packets is a power-intensive operation. As such, most client devices switch to a power-saving mode when there are no data packets for the client device to receive and/or transmit. For some client devices, switching to the power-saving mode includes switching to a sleep mode. Most client devices switch out of sleep mode when there are data packets for the client device to receive and/or transmit. While switching to sleep mode helps conserve power, in the sleep mode the client device is unable to receive data packets that are destined for the client device. Hence, data packets sent to a client device while the client device is in sleep mode are typically dropped or lost. Moreover, switching out of sleep mode when there are no data packets for the client device to receive and/or transmit results in a waste of power.

BRIEF DESCRIPTIONS OF THE DRAWINGS

For a better understanding of aspects of the various implementations described herein and to show more clearly how they may be carried into effect, reference is made, by way of example only, to the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

OVERVIEW

Various implementations disclosed herein include apparatuses, systems, and methods for synthesizing a unified traffic indicator map (TIM). In various implementations, a method is performed by a first access point (AP) of a plurality of access points (APs). In some implementations, the first AP includes a non-transitory memory and one or more processors coupled with the non-transitory memory. In some implementations, the method includes determining traffic information for a first set of client devices that are being served by the first AP. In some implementations, the method includes obtaining traffic information for a second set of client devices that are being served by a second AP of the plurality of APs. In some implementations, the method includes synthesizing a unified traffic indicator map (TIM) based on the traffic information for the first set of client devices and the traffic information for the second set of client devices. In some implementations, the method includes transmitting the unified TIM to the plurality of APs. In some implementations, the unified TIM satisfies a network performance criterion.

In some implementations, obtaining the traffic information for the second set of client devices includes receiving, from the second AP, buffered traffic status for each of the second set of client devices. In some implementations, the traffic information for the first set of client devices includes buffered traffic status for each of the first set of client devices.

In some implementations, the unified TIM includes the traffic information for the first set of client devices and the traffic information for the second set of client devices. In some implementations, the unified TIM reduces a power consumption of at least one of the first set of client devices or the second set of client devices. In some implementations, the unified TIM reduces a number of erroneous switches into and out of a power-saving sleep mode by at least one of the first set of client devices or the second set of client devices. In some implementations, the unified TIM reduces a number of packets that are dropped by at least one of the first set of client devices or the second set of client devices.

In some implementations, the method includes assigning association identifiers (AIDs) to the second set of client devices when the second set of client devices associate with the second AP.

In some implementations, the plurality of APs collectively form a logical AP that is associated with a basic service set identifier (BSSID).

In some implementations, the method includes broadcasting, by the first AP, a first beacon that includes the unified TIM. In some implementations, the method includes broadcasting, by the second AP, a second beacon that includes the unified TIM.

In various implementations, the present disclosure provides a controller comprising a processor provided to execute computer readable instructions included on a non-transitory memory. In some implementations, the controller includes a non-transitory memory including computer readable instructions, that when executed by the processor, cause the controller to obtain traffic information for a first set of client devices that are being served by a first access point (AP) of a plurality of access points (APs). In some implementations, the controller obtains traffic information for a second set of client devices that are being served by a second AP of the plurality of APs. In some implementations, the controller synthesizes a unified traffic indicator map (TIM) based on the traffic information for the first set of client devices and the traffic information for the second set of client devices. In some implementations, the controller transmits the unified TIM to the plurality of APs. In some implementations, the unified TIM satisfies a network performance criterion.

Example Embodiments

Figure 1:
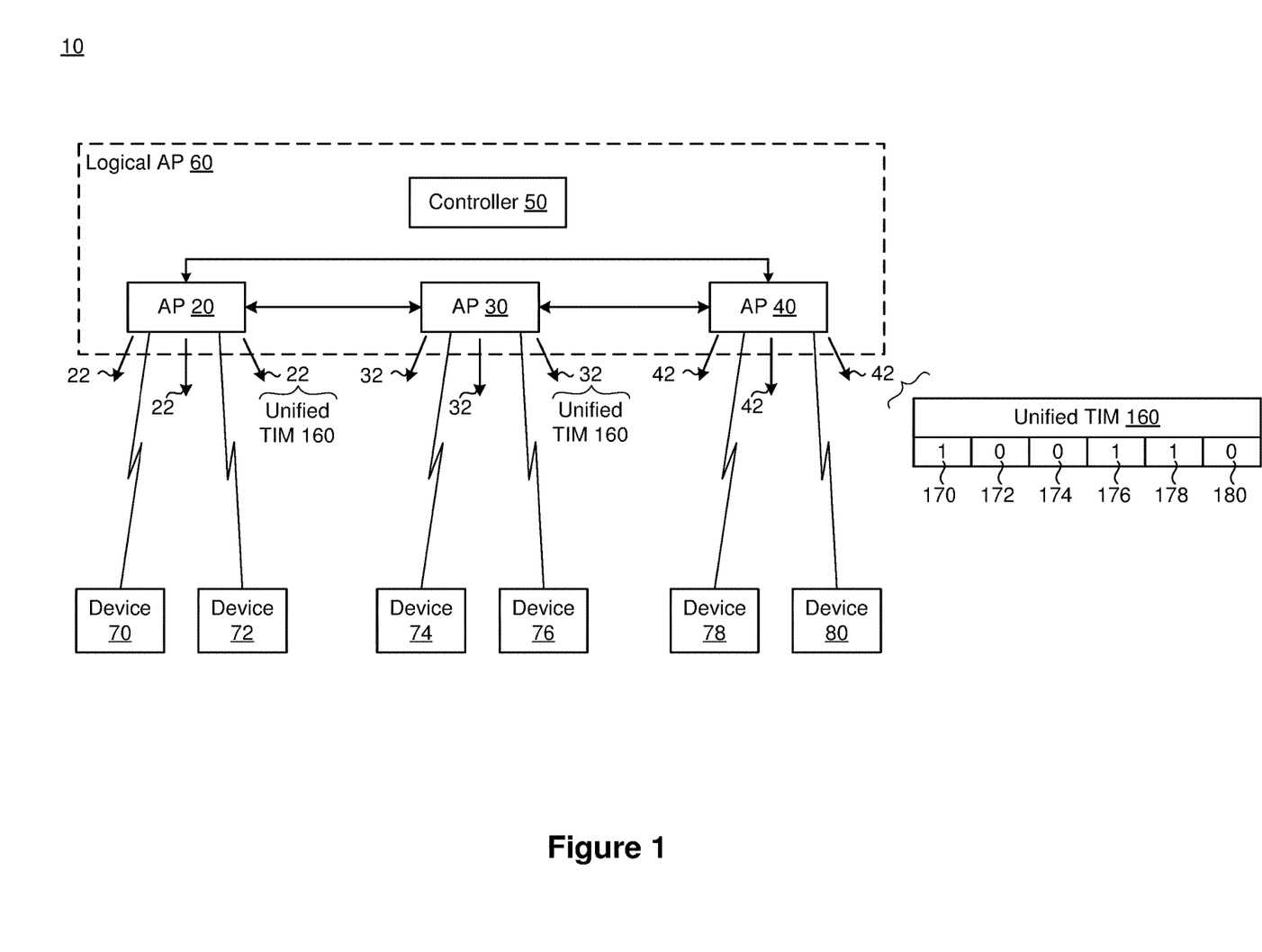
FIG. 1 is a schematic diagram of a network environment in accordance with some implementations.

FIG. 1 is a schematic diagram of a network environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network environment 10 includes a first physical access point (AP) 20 ("AP 20", hereinafter for the sake of brevity), a second physical AP 30 ("AP 30", hereinafter for the sake of brevity), a third physical AP 40 ("AP 40", hereinafter for the sake of brevity), and a controller 50. In some implementations, the network environment 10 includes additional physical APs ("APs", hereinafter for the sake of brevity). In some implementations, the controller 50 is a part of (e.g., integrated into) one or more of the APs 20, 30 and 40.

In the example of FIG. 1, the AP 20 is associated with client devices 70 and 72. As such, the AP 20 is serving the client devices 70 and 72. In some implementations, the AP 20 routes traffic to and from the client devices 70 and 72. The AP 30 is associated with client devices 74 and 76. As such, the AP 30 routes traffic to and from the client devices 74 and 76. The AP 40 is associated with client devices 78 and 80. As such, the AP 40 routes traffic to and from the client devices 78 and 80. Although FIG. 1 illustrates each AP 20, 30 and 40 serving two client devices, in some implementations, the APs 20, 30 and 40 serve fewer or additional client devices.

In the example of FIG. 1, the APs 20, 30 and 40 collectively form a logical AP 60. The logical AP 60 is associated with a basic service set identifier (BSSID) 62. Since the APs 20, 30 and 40 form the logical AP 60, the APs 20, 30 and 40 are associated with the BSSID 62. In some implementations, the APs 20, 30 and 40 advertise that the APs 20, 30 and 40 are associated with the BSSID 62. Since the APs 20, 30 and 40 are associated with the same BSSID 62, the client devices 70-80 are able to seamlessly roam between the APs 20, 30 and 40. In some implementations, since the APs 20, 30 and 40 are associated with the same BSSID 62, the client devices 70-80 are able to switch between the APs 20, 30 and 40 without going through a registration process (e.g., without establishing login credentials for each of the APs 20, 30 and 40).

In various implementations, the APs 20, 30 and 40 transmit (e.g., broadcast) beacons 22, 32 and 42, respectively. In some implementations, the beacons 22, 32 and 42 include a unified traffic indicator map (TIM) 160. In some implementations, the unified TIM 160 indicates whether there is traffic for each of the client devices 70-80. In the example of FIG. 1, the unified TIM 160 includes traffic indicator fields 170-180 for the client devices 70-80, respectively. In some implementations, a value of '1' indicates that there is traffic for a particular client device. For example, the traffic indicator field 170 for the client device 70 has a value of '1' indicating that the AP 20 has data packets for the client device 70. Similarly, the traffic indicator field 176 for the client device 76 has a value of '1' indicating that the AP 30 has data packets for the client device 76. In some implementations, a value of '0' indicates that there is no traffic for a particular client device. For example, the traffic indicator field 172 for the client device 72 has a value of '0' indicating that the AP 20 has no traffic for the client device 72. Similarly, the traffic indicator field 180 has a value of '0' indicating that the AP 40 has no traffic for the client device 80.

In some implementations, the unified TIM 160 indicates a status of a traffic buffer for each of the client device 70-80. In such implementations, a traffic indicator field value of '1' indicates that the traffic buffer breaches (e.g., exceeds) a threshold size (e.g., the traffic buffer is full). When the traffic indicator field corresponding to a particular client device has a value of '1', then the AP is ready to transmit the data packets for that particular client device. In some implementations, a traffic indicator field value of '0' indicates that the traffic buffer does not breach (e.g., does not exceed) the threshold size (e.g., the traffic buffer is not full). When the traffic indicator field corresponding to a particular client device has a value of '0', then the AP is not ready to transmit the data packets for that particular client device.

In some implementations, the client devices 70-80 utilize the unified TIM 160 to switch into and out of a power-saving sleep mode ("sleep mode", hereinafter for the sake of brevity). In some implementations, a client device switches into the sleep mode when the traffic indicator field corresponding to the client device has a value of '0'. In the example of FIG. 1, the client devices 72, 74 and 80 switch into the sleep mode because their corresponding traffic indicator fields 172, 174 and 180, respectively, have a value of '0'. In some implementations, a client device remains in a transmit/receive mode when the traffic indicator field corresponding to the client device has a value of '1'. In some implementations, a client device forgoes switching into the sleep mode and/or switches out of the sleep mode when the traffic indicator field corresponding to the client device has a value of '1'. In the example of FIG. 1, the client devices 70, 76 and 78 remain in the transmit/receive mode (e.g., forgo switching into the sleep mode and/or switch out of the sleep mode) because their corresponding traffic indicator fields 170, 176 and 178, respectively, have a value of '1'.

In some implementations, a client device receives beacons from APs that the client device is not associated with because APs broadcast their beacons. In the example of FIG. 1, the client device 74 receives the beacon 22 from the AP 20 even though the client device 74 is not associated with the AP 20. Similarly, the client device 74 receives the beacon 42 from the AP 40 even though the client device 74 is not associated with the AP 40. In some implementations, including the unified TIM 160 in the beacons 22 and 42 tends to reduce a number of erroneous switches into and out of the sleep mode by the client device 74. If the beacon 22 only had traffic indicator fields 170 and 172, then the client device 74 may erroneously have stayed in the transmit/receive mode based on the traffic indicator field 170 having a value of '1'. This erroneous stay in the transmit/receive mode would result in unnecessary power consumption by the client device 74. However, because the beacon 22 has the traffic indicator field 174 for the client device 74, the client device 74 correctly switches to sleep mode thereby reducing its power consumption.

In some implementations, including the unified TIM 160 in the beacons 22, 32 and 42 reduces a number of dropped/lost packets. As shown in FIG. 1, the client device 78 receives the beacon 22 from the AP 20 and the beacon 32 from the AP 30 even though the client device 78 is associated with the AP 40 and not associated with the APs 20 and 30. If the beacon 32 only had traffic indicator fields 174 and 176, then the client device 78 may erroneously switch to the sleep mode based on the traffic indicator field 174 having a value of '0'. This erroneous switch to the sleep mode would result in the client device 78 not being in the transmit/receive mode when the AP 40 transmits data packets to the client device 78. As such, the erroneous switch to the sleep mode would result in dropped/lost packets. However, because the beacon 32 has the traffic indicator field 178 for the client device 78, the client device 78 correctly stays in the transmit/receive mode thereby reducing the number of dropped/lost packets.

In various implementations, the unified TIM 160 satisfies a network performance criterion. In some implementations, the unified TIM 160 improves a performance of a network. For example, as discussed herein, in some implementations, the unified TIM 160 reduces power consumption of client devices by reducing erroneous switches into and out of sleep mode. As discussed herein, in some implementations, the unified TIM 160 reduces a number of packets that are dropped/lost by the client devices.

Figure 2:
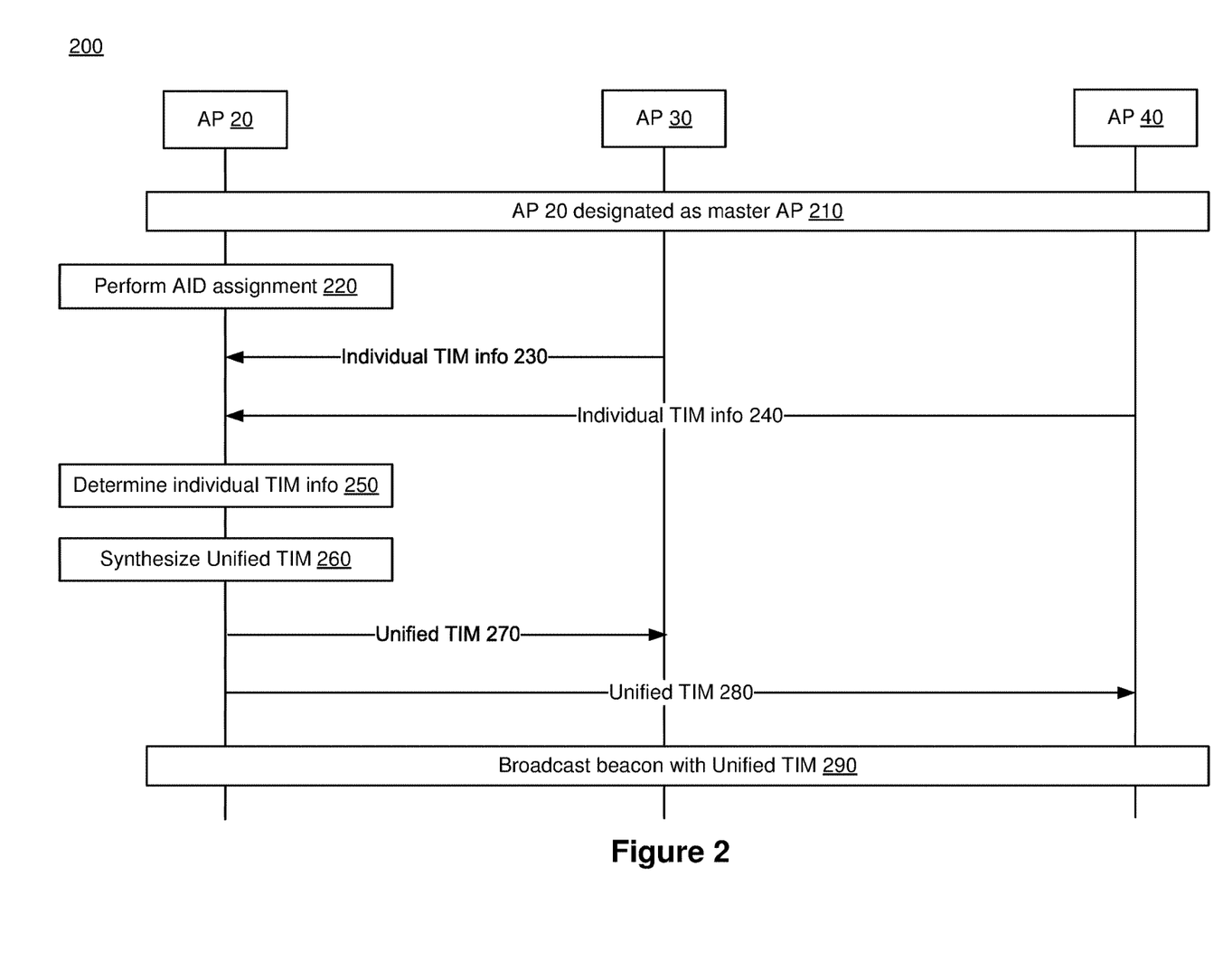
FIG. 2 is a sequence illustrating various operations performed by an access point (AP) in accordance with some implementations.

FIG. 2 illustrates a sequence of operations 200 that are performed by the APs 20, 30 and 40 in accordance with some implementations. As represented by operation 210, in some implementations, the AP 20 is designated as a master AP. In some implementations, a network administrator (e.g., a human operator) designates the AP 20 as the master AP. In some implementations, the APs 30 and 40 designate the AP 20 as the master AP.

As represented by operation 220, in some implementations, the AP 20 performs association identifier (AID) assignment. In some implementations, each client device has an AID. In some implementations, a client device obtains an AID when the client device associates with an AP. For example, referring to FIG. 1, the client devices 70 and 72 obtain their respective AIDs when the client devices 70 and 72 associate with the AP 20. Similarly, the client devices 74 and 76 obtain their respective AIDs when the client devices 74 and 76 associate with the AP 30. In some implementations, the traffic indicator fields 170-180 in the unified TIM 160 are associated with AIDs of the client devices 70-80. In such implementations, a client device identifies its corresponding traffic indicator field in the unified TIM 160 by locating the traffic indicator field that is associated with AID of the client device. In some implementations, the master AP performing the AID assignment reduces the likelihood of multiple client devices having the same AID. Advantageously, since the AID assignment is performed by a single entity (e.g., the master AP), each client device has a unique AID thereby preventing erroneous switches to/from the sleep mode. As discussed herein, preventing erroneous switches to/from the sleep mode reduces power consumption and/or reduces packet loss. In various implementations, an AID refers to an identifier that is assigned to a client device when the client device associates with an AP.

As represented by operations 230 and 240, in some implementations, the master AP obtains traffic information for client devices that are being served by other APs. In some implementations, the master AP receives individual TIMs (e.g., TIM bit values) from the other APs. For example, in some implementations, the AP 20 receives an individual TIM from the AP 30. The individual TIM from the AP 30 indicates whether the AP 30 has traffic for client devices that are associated with the AP 30. For example, the individual TIM from the AP 30 indicates a buffered traffic status for the client devices 74 and 76 that the AP 30 is serving in the example of FIG. 1. Similarly, the AP 20 receives an individual TIM from the AP 40. The individual TIM from the AP 40 indicates whether the AP 40 has traffic for client devices that are associated with the AP 40. For example, the individual TIM from the AP 40 indicates a buffered traffic status for the client devices 78 and 80 that the AP 40 is serving in the example of FIG. 1. In some implementations, obtaining traffic information for client devices that are being served by another AP includes obtaining a binary value for each client device (e.g., obtaining a '1' if the other AP has traffic for a particular client device and obtaining a '0' if the other AP does not have traffic for that particular client device).

In some implementations, the master AP obtains the traffic information when the buffered traffic status of a client device changes. This reduces the number of times that information is exchanged between the APs thereby reducing communication overhead and/or network congestion.

As represented by operation 250, in some implementations, the master AP determines its individual TIM. For example, the AP 20 determines its individual TIM. In some implementations, the AP 20 determines whether the AP 20 has traffic for the client devices that the AP 20 is serving. For example, the AP 20 determines buffered traffic status for client devices 70 and 72 that the AP 20 is serving in the example of FIG. 1. In some implementations, determining the individual TIM includes setting a binary value for each client device that the master AP is serving. In some implementations, the master AP sets a binary value of '1' for client devices for which the master AP has traffic (e.g., setting the traffic indicator field 170 to a '1' because the AP 20 has traffic for the client device 70). In some implementations, the master AP sets a binary value of '0' for client devices for which the master AP does not have traffic (e.g., setting the traffic indicator field 172 to a '0' because the AP 20 has no traffic for the client device 72).

As represented by operation 260, in some implementations, the master AP synthesizes a unified TIM (e.g., the unified TIM 160 shown in FIG. 1). In some implementations, the master AP synthesizes the unified TIM by merging (e.g., combining) the individual TIMs that the master AP receives from other APs with the individual TIM of the master AP. For example, the AP 20 synthesizes the unified TIM 160 by combining the individual TIM for the AP 20 with the individual TIMs for the APs 30 and 40. In some implementations, the master AP synthesizes the unified TIM by appending the individual TIMs of other APs to the individual TIM of the master AP. For example, the AP 20 synthesizes the master TIM 160 by appending the individual TIMs of the APs 30 and 40 to the individual TIM of the AP 20.

As represented by operations 270 and 280, in some implementations, the master AP transmits (e.g., distributes or shares) the unified TIM with the other APs that form the logical AP. In the example of FIG. 2, the AP 20 transmits the unified TIM (e.g., the unified TIM 160 shown in FIG. 1) to the APs 30 and 40. In some implementations, the master AP synthesizes and transmits the unified AP in response to detecting a change in its individual TIM. In some implementations, the master AP synthesizes and transmits the unified AP in response to obtaining an updated individual TIM from another AP.

As represented by operation 290, in some implementations, the APs 20, 30 and 40 transmit (e.g., broadcast) beacons that include the unified TIM. As discussed herein, including the unified TIM in the beacons improves a performance of the network. For example, as discussed herein, including the unified TIM in the beacons reduces a number of erroneous switches into and out of the sleep mode by client devices. Moreover, as discussed herein, in some implementations, including the unified TIM in the beacons reduces power consumption by the client devices. Furthermore, as discussed herein, in some implementations, including the unified TIM in the beacons reduces a number of packets that are dropped/lost.

Figure 3:
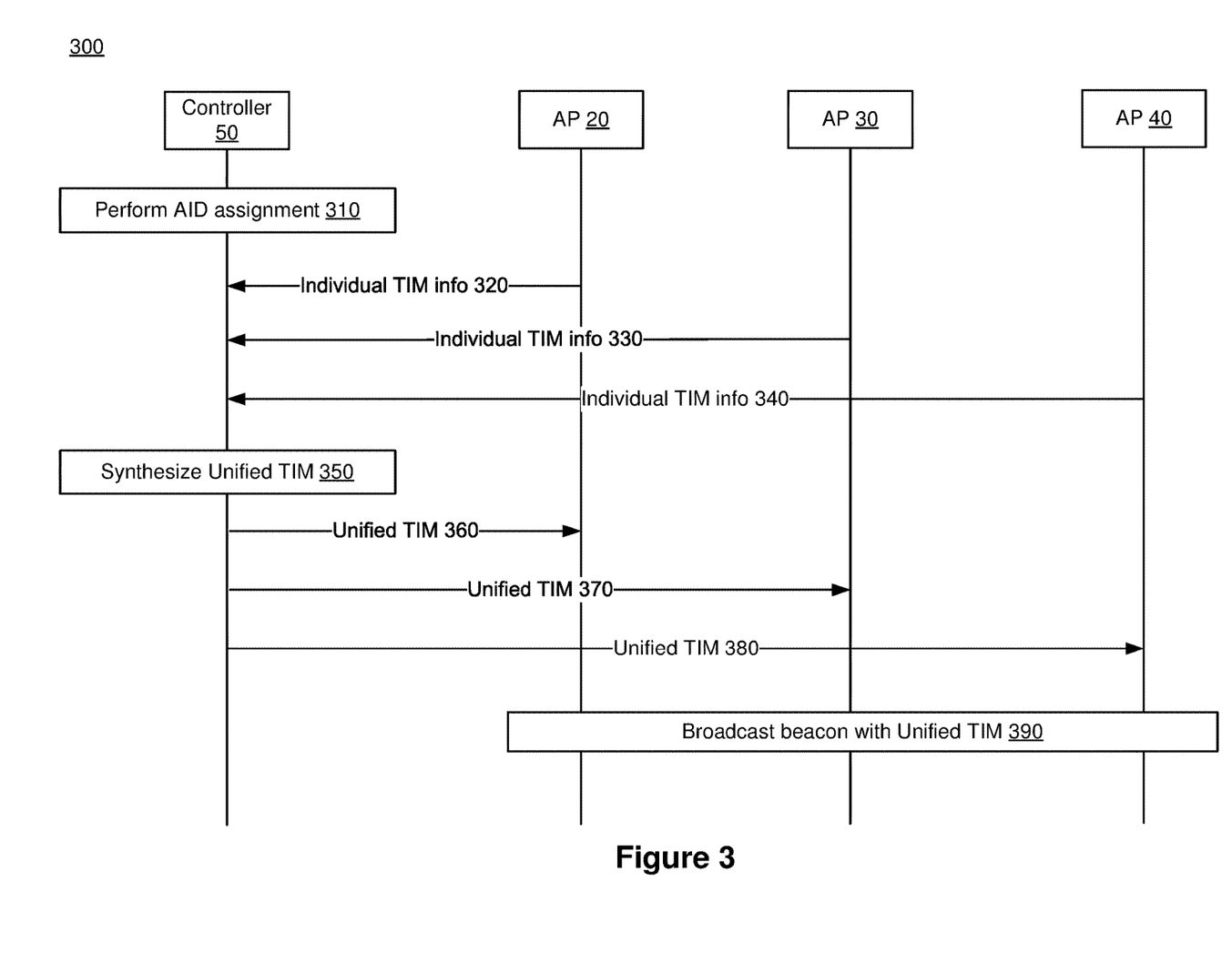
FIG. 3 is a sequence illustrating various operations performed by a controller in accordance with some implementations.

FIG. 3 illustrates a sequence of operations 300 that are performed by the controller 50 in accordance with some implementations. As represented by operation 310, in some implementations, the controller 50 performs AID assignment. In some implementations, the controller 50 assigns AIDs to client devices when the client devices associate with the APs 20, 30 and 40. In some implementations, the controller 50 performing the AID assignment reduces the likelihood of multiple client devices having the same AID. Advantageously, since the AID assignment is performed by a single entity (e.g., the controller 50), each client device has a unique AID thereby preventing erroneous switching to/from the sleep mode. As discussed herein, preventing erroneous switching to/from the sleep mode reduces power consumption and/or reduces packet loss.

As represented by operations 320, 330 and 340, in some implementations, the controller 50 obtains traffic information for client devices that are being served by various APs. In some implementations, the controller 50 receives individual TIMs (e.g., TIM bit values) from the APs. For example, in some implementations, the controller 50 receives a first individual TIM from the AP 20. The first individual TIM from the AP 20 indicates whether the AP 20 has traffic for client devices that are associated with the AP 20. For example, the first individual TIM from the AP 20 indicates a buffered traffic status for the client devices 70 and 72 that the AP 20 is serving in the example of FIG. 1. Similarly, the controller 50 receives a second individual TIM from the AP 30. The second individual TIM from the AP 30 indicates whether the AP 30 has traffic for client devices that are associated with the AP 30. For example, the individual TIM from the AP 30 indicates a buffered traffic status for the client devices 74 and 76 that the AP 30 is serving in the example of FIG. 1. Similarly, the controller 50 receives a third individual TIM from the AP 40. The third individual TIM from the AP 40 indicates whether the AP 40 has traffic for client devices that are associated with the AP 40. For example, the individual TIM from the AP 40 indicates a buffered traffic status for the client devices 76 and 80 that the AP 40 is serving in the example of FIG. 1. In some implementations, obtaining traffic information for client devices that are being served by various APs includes obtaining binary values for each client device (e.g., obtaining a '1' if the AP has traffic for a particular client device and obtaining a '0' if the AP does not have traffic for that particular client device).

In some implementations, the controller 50 obtains the traffic information when the buffered traffic status of a client device changes. This reduces the number of times that information is exchanged between the controller 50 and the APs thereby reducing communication overhead and/or network congestion.

As represented by operation 350, in some implementations, the controller 50 synthesizes a unified TIM (e.g., the unified TIM 160 shown in FIG. 1). In some implementations, the controller 50 synthesizes the unified TIM by merging (e.g., combining) the individual TIMs that the controller 50 receives from the APs. For example, the controller 50 synthesizes the unified TIM 160 by combining the individual TIM for the AP 20, the individual TIM for the AP 30 and the individual TIM for the AP 40.

As represented by operations 360, 370 and 380, in some implementations, the controller 50 transmits (e.g., distributes or shares) the unified TIM to the APs that form the logical AP. In the example of FIG. 3, the controller 50 transmits the unified TIM (e.g., the unified TIM 160 shown in FIG. 1) to the APs 20, 30 and 40. In some implementations, the controller 50 synthesizes and transmits the unified TIM in response to obtaining an updated individual TIM from one of the APs 20, 30 and 40.

As represented by operation 390, in some implementations, the APs 20, 30 and 40 transmit (e.g., broadcast) beacons that include the unified TIM. As discussed herein, including the unified TIM in the beacons improves a performance of the network. For example, as discussed herein, including the unified TIM in the beacons reduces a number of erroneous switches into and out of the sleep mode by client devices. Moreover, as discussed herein, in some implementations, including the unified TIM in the beacons reduces power consumption of the client devices. Furthermore, as discussed herein, in some implementations, including the unified TIM in the beacons reduces a number of packets that are dropped/lost.

Figure 4A:
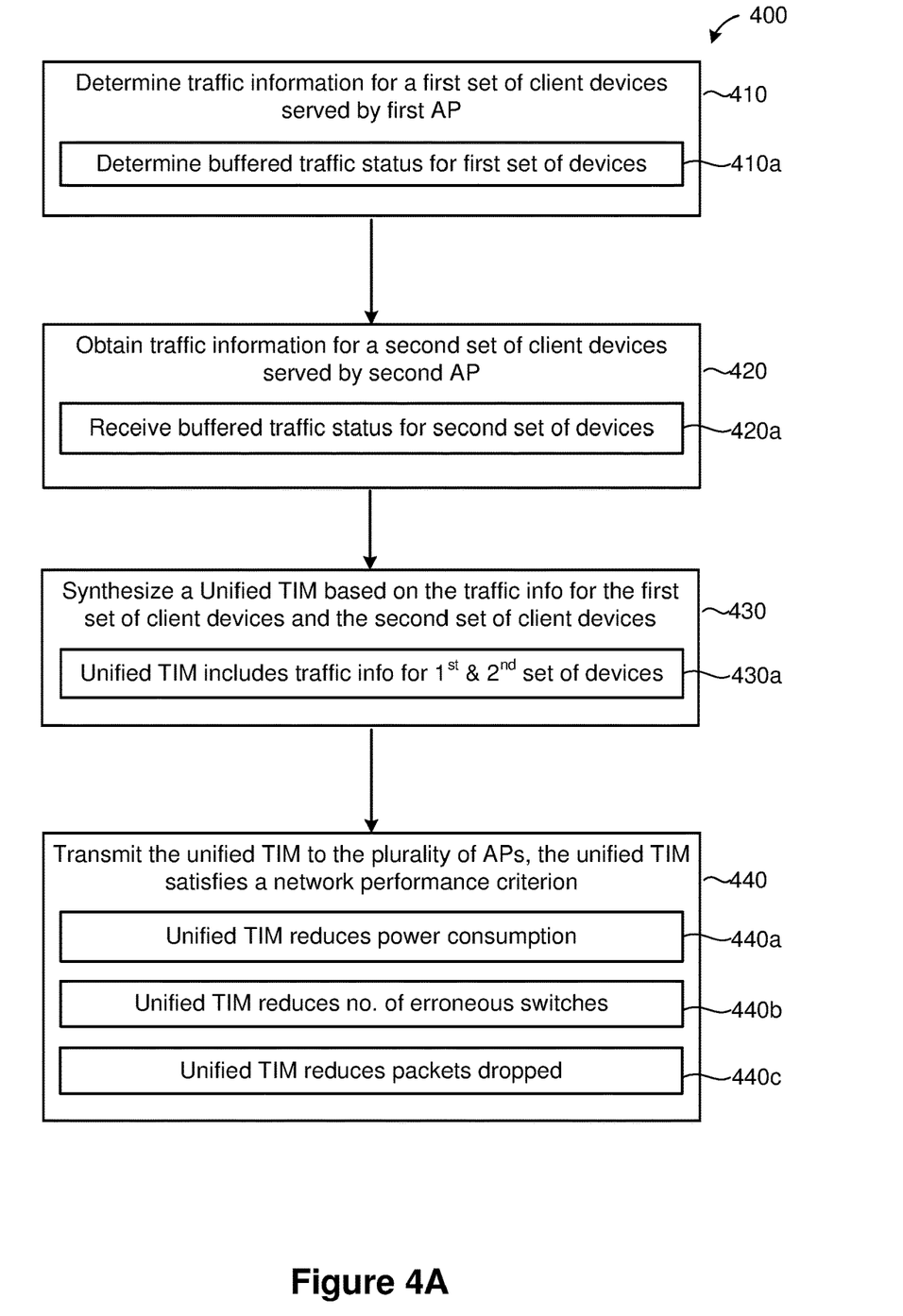
FIGS. 4A-4B are flowchart representations of a method for synthesizing a unified traffic indicator map (TIM) in accordance with some implementations.

FIG. 4A is a flowchart representation of a method 400 for generating a unified TIM. In various implementations, the method 400 is implemented as a set of computer readable instructions that are executed at a device (e.g., at an AP designated as a master AP within a collection of APs that form a logical AP, for example, the AP 20 shown in FIGS. 1 and 2, and/or at a controller, for example, the controller 50 shown in FIGS. 1 and 3). Briefly, the method 400 includes determining traffic information for a first set of client devices served by a first AP, obtaining traffic information for a second set of client devices served by a second AP, synthesizing a unified TIM based on the traffic information for the first set of client devices and the second set of client devices, and transmitting the unified TIM to the plurality of APs.

In some implementations, the method 400 is executed at a first AP of a plurality of APs (e.g., at the AP 20 shown in FIGS. 1 and 3). In some implementations, the first AP includes a non-transitory memory and one or more processors that are coupled with the non-transitory memory. As represented by block 410, in various implementations, the method 400 includes determining traffic information for a first set of client devices that are being served by the first AP. For example, the method 400 includes determining traffic information for the client devices 70 and 72 that are being served by the AP 20 shown in FIG. 1.

As represented by block 410a, in some implementations, the method 400 includes determining buffered traffic status for the first set of client devices. In some implementations, the AP maintains a traffic buffer for each client device that the AP serves. In such implementations, the AP is ready to transmit data packets to a particular client device when the traffic buffer for that particular client device breaches (e.g., exceeds) a threshold size (e.g., a threshold number of data packets). In some implementations, the method 400 includes determining whether, for each client device, the traffic buffer breaches the threshold size.

In some implementations, the method 400 includes generating an individual TIM that indicates the traffic information (e.g., the buffered traffic status) for each client device that the AP serves. In some implementations, the method 400 includes setting binary values for traffic indicator fields that correspond to respective client devices that the AP serves. In some implementations, the method 400 includes setting the value of a particular traffic indicator field to '1' if the AP is ready to transmit traffic to the corresponding client device (e.g., if the traffic buffer of the corresponding client device breaches the threshold size). In some implementations, the method 400 includes setting the value of a particular traffic indicator field to '0' if the AP is not ready to transmit traffic to the corresponding client device (e.g., if the traffic buffer of the corresponding client device does not breach the threshold size).

As represented by block 420, in some implementations, the method 400 includes obtaining traffic information for a second set of client devices that are being served by a second AP of the plurality of APs. In some implementations, the method 400 includes obtaining traffic information for client devices that are being served by APs that collectively form a logical AP. As represented by block 420a, in some implementations, the method 400 includes receiving buffered traffic status for the second set of devices. In some implementations, the method 400 includes receiving an individual TIM from the second AP that indicates that buffered traffic status for the second set of client devices that the second AP serves. For example, receiving the individual TIM from the AP 30, as illustrated by operation 230 in FIG. 2.

As represented by block 430, in some implementations, the method 400 includes synthesizing a unified TIM (e.g., the unified TIM 160 shown in FIG. 1) based on the traffic information for the first set of client devices and the traffic information for the second set of client devices. As represented by block 430a, in some implementations, the unified TIM includes the traffic information for the first set of client devices and the traffic information for the second set of client devices. In some implementations, the method 400 includes merging (e.g., combining) the individual TIM obtained from the second AP with the individual TIM generated by the first AP. In some implementations, the method 400 includes synthesizing a unified TIM that includes AIDs of all client devices that are served by the logical AP, and associating each AID with a buffered traffic status.

As represented by block 440, in some implementations, the method 400 includes transmitting the unified TIM to the plurality of APs. For example, the AP 20 transmits the unified TIM to the APs 30 and 40, as illustrated by operations 270 and 280 shown in FIG. 2. More generally, in various implementations, the method 400 includes transmitting the unified TIM to all APs that collectively form the logical AP, so that each AP can include the unified TIM in the beacons that the AP broadcasts.

In some implementations, the unified TIM satisfies a network performance criterion. As represented by block 440a, in some implementations, the unified TIM reduces a power consumption of the first set of client devices and/or the second set of client devices. More generally, in various implementations, the unified TIM reduces a power consumption of client devices that are served by the logical AP. As discussed herein, the unified TIM reduces a number of erroneous switches made by the client devices into and out of the sleep mode. By reducing the number of erroneous switches, the unified TIM reduces an amount of time that the client devices spend in the transmit/receive mode and increases an amount of time that the client devices spend in the power-saving sleep mode thereby reducing the power consumption of the client devices.

As represented by block 440b, in some implementations, the unified TIM reduces a number of erroneous switches into and out of a power-saving sleep mode by the first set of client devices and/or the second set of client devices. As discussed herein, when each client device associated with the logical AP has a unique AID, the client devices are less likely to erroneously switch into and out of the power-saving sleep mode.

As represented by block 440c, in some implementations, the unified TIM reduces a number of packets that are dropped by the first set of client devices and/or the second set of client devices. As discussed herein, the unified TIM reduces a number of erroneous switches made by the client devices into and out of the sleep mode. By reducing the number of erroneous switches, the unified TIM reduces the likelihood that a client device will be in sleep mode when the AP associated with the client device is transmitting data packets to the client device.

Figure 4B:
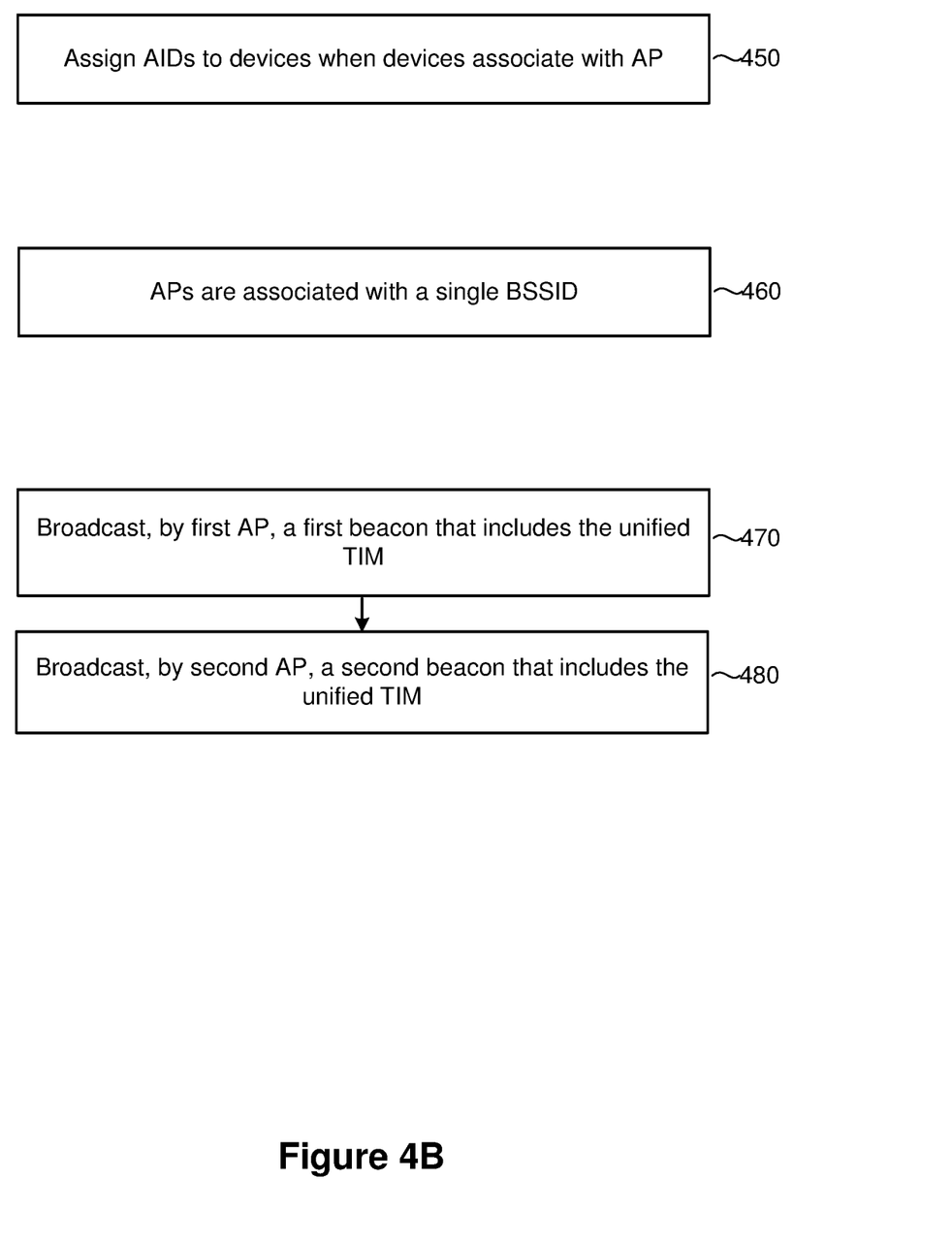

Referring to FIG. 4B, as represented by block 450, in some implementations, the method 400 includes assigning AIDs to the second set of client devices when the second set of client devices associate with the second AP. In some implementations, the AID assignment is performed by a master AP (e.g., by the AP 20 shown in FIG. 2). In some implementations, the AID assignment is performed by a controller (e.g., by the controller 50 shown in FIG. 3). In some implementations, the master AP and/or the controller provides each AP a list of permissible AIDs, and the APs assign AIDs from the list provided by the master AP and/or the controller. In such implementations, the different lists are provided to different APs thereby preventing the same AID being assigned to client devices that are being served by different APs.

As represented by block 460, in some implementations, the APs are associated with a BSSID. In some implementations, the APs collectively form a logical AP (e.g., the APs 20, 30 and 40 form the logical AP 60 shown in FIG. 1). The APs advertise the same BSSID thereby allowing client devices to seamlessly roam between the APs without undergoing a registration process.

As represented by block 470, in some implementations, the method 400 includes broadcasting, by the first AP, a first beacon that includes the unified TIM. For example, the AP 20 broadcasts the beacons 22 that include the unified TIM 160. As represented by block 480, in some implementations, the method 400 includes broadcasting, by the second AP, a second beacon that includes the unified TIM. For example, the AP 30 broadcasts the beacons 32 that include the unified TIM 160. More generally, in various implementations, each AP broadcasts beacons that include the unified TIM.

Figure 5:
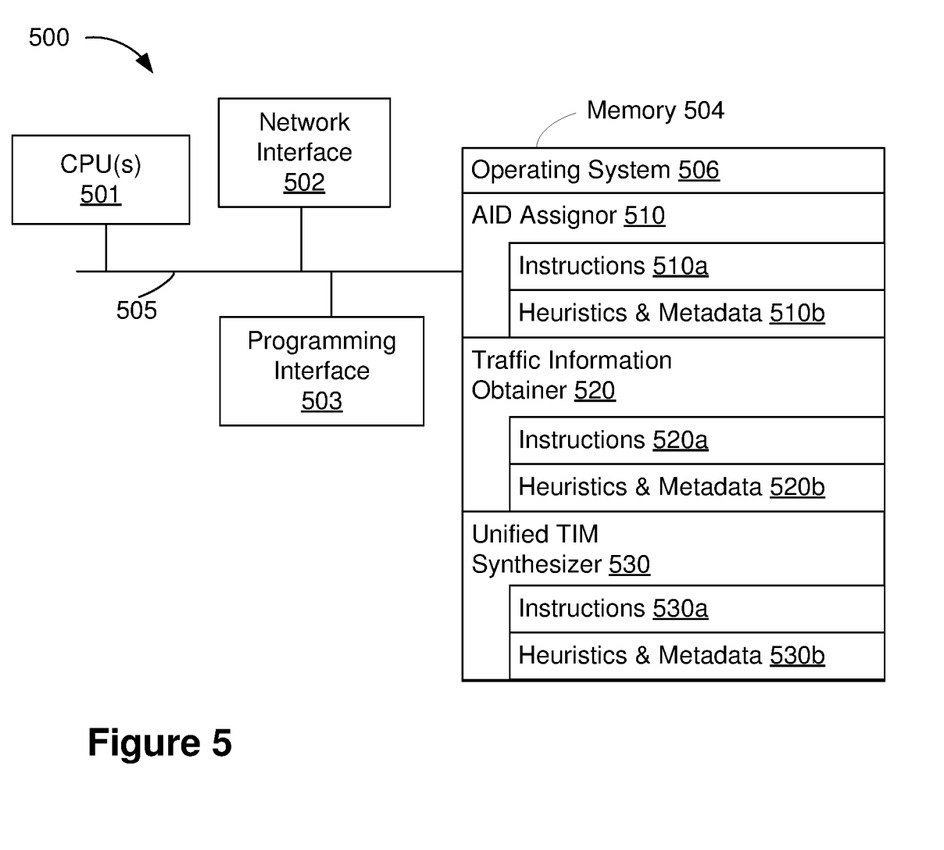
FIG. 5 is a block diagram of a device enabled with various modules that are provided to generate a unified TIM in accordance with some implementations.

FIG. 5 is a block diagram of a device 500 enabled with one or more components of a device (e.g., an AP, for example, the AP 20 shown in FIGS. 1 and 2, and/or a controller, for example, the controller 50 shown in FIGS. 1 and 3) that synthesizes a unified TIM (e.g., the unified TIM 160 shown in FIG. 1). While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In various implementations, the network interface 502 allows the device 500 to communicate with devices that are upstream or downstream relative to the device 500 in a hierarchy. In some implementations, the communication buses 505 include circuitry that interconnects and controls communications between system components. The memory 504 includes high-speed random access memory, such as DRAM, SRAM, DDR RAM or other random access solid state memory devices and may include non-volatile memory, such as one or more magnetic disk storage devices, optical disk storage devices, flash memory devices, or other non-volatile solid state storage devices. The memory 504 optionally includes one or more storage devices remotely located from the CPU(s) 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, an AID assignor 510, a traffic information obtainer 520 and a unified TIM synthesizer 530. In some implementations, the AID assignor 510 performs AID assignment. For example, as described in relation to operation 220 shown in FIG. 2 and/or operation 320 shown in FIG. 3, in some implementations, the AID assignor 510 assigns AIDs to client devices that are served by various physical APs that form a logical AP. To that end, in various implementations, the AID assignor 510 includes instructions and/or logic 510a, and heuristics and metadata 510b.

In some implementations, the traffic information obtainer 520 obtains traffic information for client devices that are served by various physical APs that form a logical AP. For example, as described in relation to operations 230 and 240 shown in FIG. 2 and/or operations 320, 330 and 340 shown in FIG. 3, the traffic information obtainer 520 receives traffic information from physical APs that form the logical AP. In some implementations, the traffic information obtainer 520 receives individual TIMs for various physical APs. In some implementations, the traffic information obtainer 520 determines the traffic information (e.g., the individual TIM) for an AP in which the traffic information obtainer 520 resides (e.g., as illustrated by operation 250 in FIG. 2). To that end, in various implementations, the traffic information obtainer 520 includes instructions and/or logic 520a, and heuristics and metadata 520b.

In some implementations, the unified TIM synthesizer 530 synthesizes a unified TIM (e.g., the unified TIM 160 shown in FIG. 1). In some implementations, the unified TIM synthesizer 530 synthesizes the unified TIM by merging (e.g., combining) individual TIMs provided by different APs. To that end, in various implementations, the unified TIM synthesizer 530 includes instructions and/or logic 530a, and heuristics and metadata 530b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
  determining, by a first access point (AP) of a plurality of access points (APs), traffic information for a first set of client devices served by the first AP, wherein the traffic information for the first set of client devices comprises a respective traffic indicator map (TIM) for the first set of client devices;
  obtaining, by the first AP and from each remaining AP in the plurality of APs, traffic information for a second set of client devices served by each remaining AP in the plurality of APs, wherein the traffic information for the second set of client devices comprises a set of TIMs for the second set of client devices;

generating, by the first AP, a unified TIM associated with the first set of client devices and the second set of client devices by merging the respective TIM and the set of TIM; and transmitting, by the first AP, the unified TIM to each remaining AP in the plurality of APs, wherein the unified TIM satisfies a network performance criterion.

2. The method of claim 1, wherein obtaining the traffic information for the second set of client devices comprises:
receiving, from each remaining AP in the plurality of APs, buffered traffic status for each of the second set of client devices.

3. The method of claim 1, wherein the traffic information for the first set of client devices includes buffered traffic status for each of the first set of client devices.

4. The method of claim 1, wherein the unified TIM includes the traffic information for the first set of client devices and the traffic information for the second set of client devices.

5. The method of claim 1, wherein the unified TIM reduces a power consumption of at least one of the first set of client devices or the second set of client devices.

6. The method of claim 1, wherein the unified TIM reduces a number of erroneous switches into and out of a power-saving sleep mode by at least one of the first set of client devices or the second set of client devices.

7. The method of claim 1, wherein the unified TIM reduces a number of packets that are dropped by at least one of the first set of client devices or the second set of client devices.

8. The method of claim 1, wherein the unified TIM comprises a respective traffic indicator field for each client device from the first set of client devices and the second set of client devices, the method further comprising:
generating, by the first AP, a respective unique association identifier for each client device in the first set of client devices served by the first AP and each client device in the second set of client devices served by each remaining AP from the plurality of APs, each respective unique association identifier of each client device being unique relative to the respective unique association identifier of each other client device from the first set of client devices and the second set of client devices; and
associating the respective traffic indicator field included in the unified TIM for each client device with the respective unique association identifier for each client device.

9. The method of claim 1, wherein the plurality of APs collectively form a logical AP that is associated with a basic service set identifier (BSSID).

10. The method of claim 1, further comprising:
broadcasting, by the first AP, a first beacon that includes the unified TIM; and
broadcasting, by a second AP from the plurality of APs, a second beacon that includes the unified TIM.

11. A system comprising:
one or more processors; and
at least one non-transitory memory including computer readable instructions, that when executed by the one or more processors, cause the one or more processors to:
obtain traffic information for a first set of client devices served by a first access point (AP) from a plurality of APs, wherein the traffic information for the first set of client devices comprises a respective traffic indicator map (TIM) for the first set of client devices;
obtain traffic information for a second set of client devices served each remaining AP in the plurality of APs, wherein the traffic information for the second set of client devices comprises a set of TIMs for the second set of client devices;
generate a unified TIM associated with the first set of client devices and the second set of client devices by merging the respective TIM and the set of TIM; and
transmit the unified TIM to the plurality of APs, wherein the unified TIM satisfies a network performance criterion.

12. The system of claim 11, wherein obtaining the traffic information for the first set of client devices comprises:
receiving buffered traffic status for each of the first set of client devices.

13. The system of claim 11, wherein the unified TIM includes the traffic information for the first set of client devices and the traffic information for the second set of client devices.

14. The system of claim 11, wherein the unified TIM reduces a power consumption of at least one of the first set of client devices or the second set of client devices.

15. The system of claim 11, wherein the unified TIM reduces a number of erroneous switches into and out of a power-saving sleep mode by at least one of the first set of client devices or the second set of client devices.

16. The system of claim 11, wherein the unified TIM reduces a number of packets that are dropped by at least one of the first set of client devices or the second set of client devices.

17. The system of claim 11, wherein the unified TIM comprises a respective traffic indicator field for each client device from the first set of client devices and the second set of client devices, and wherein the computer readable instructions further cause the one or more processors to:
generate a respective unique association identifier for each client device in the first set of client devices served by the first AP and each client device in the second set of client devices served by each remaining AP from the plurality of APs, each respective unique association identifier of each client device being unique relative to the respective unique association identifier of each other client device from the first set of client devices and the second set of client devices; and
associate the respective traffic indicator field included in the unified TIM for each client device with the respective unique association identifier for each client device.

18. The system of claim 11, wherein the plurality of APs are associated with a basic service set identifier (BSSID).

19. The system of claim 11, wherein the computer readable instructions further cause the one or more processors to:
broadcast a beacon that includes the unified TIM.

20. A non-transitory computer readable storage medium storing one or more computer-readable instructions which, when executed by a first access point (AP) of a plurality of access points (APs), cause the first AP to:
determine traffic information for a first set of client devices served by the first AP, wherein the traffic information for the first set of client devices comprises a respective traffic indicator map (TIM) for the first set of client devices;
obtain, from each remaining AP in the plurality of APs, traffic information for a second set of client devices served by each remaining AP in the plurality of APs, wherein the traffic information for the second set of client devices comprises a set of TIMs for the second set of client devices;
generate a unified TIM associated with the first set of client devices and the second set of client devices by merging the respective TIM and the set of TIM; and transmit the unified TIM to each remaining AP in the plurality of APs, wherein the unified TIM satisfies a network performance criterion.

\* \* \* \* \*